United States Patent
Rohloff et al.

(10) Patent No.: US 9,893,880 B2
(45) Date of Patent: *Feb. 13, 2018

(54) METHOD FOR SECURE SYMBOL COMPARISON

(71) Applicant: RAYTHEON BBN TECHNOLOGIES CORP., Cambridge, MA (US)

(72) Inventors: Kurt Rohloff, South Hadley, MA (US); David Bruce Cousins, Barrington, RI (US); Richard Schantz, Sharon, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/081,668

(22) Filed: Nov. 15, 2013

(65) Prior Publication Data

US 2014/0233728 A1   Aug. 21, 2014

Related U.S. Application Data

(60) Provisional application No. 61/727,654, filed on Nov. 16, 2012.

(51) Int. Cl.
*H04L 9/00*   (2006.01)

(52) U.S. Cl.
CPC .................................. *H04L 9/008* (2013.01)

(58) Field of Classification Search
CPC ........... H04L 2463/101; H04L 63/0428; H04L 9/008; H04W 12/02; G06F 21/6227;

(Continued)

(56) References Cited

U.S. PATENT DOCUMENTS

| 8,515,058 B1 | 8/2013 | Gentry |
| 9,083,526 B2 | 7/2015 | Gentry |

(Continued)

FOREIGN PATENT DOCUMENTS

WO   WO 2012/149395 A1   11/2012

OTHER PUBLICATIONS

Cousins (Sep. 2011). SIPHER: Scalable Implementation of Primitives for Homomorphic EncRyption, retrieved Oct. 2, 2015 from: https://www.ll.mit.edu/HPEC/agendas/proc11/Day1/Focus_2/1430_Cousins.pdf.*

(Continued)

*Primary Examiner* — Brian F Shaw
(74) *Attorney, Agent, or Firm* — Lewis Roca Rothgerber Christie LLP

(57) ABSTRACT

A method for secure comparison of encrypted symbols. According to one embodiment, a user may encrypt two symbols, share the encrypted symbols with an untrusted third party that can compute algorithms on these symbols without access the original data or encryption keys such that the result of running the algorithm on the encrypted data can be decrypted to a result which is equivalent to the result of running the algorithm on the original unencrypted data. In one embodiment the untrusted third party may perform a sequence of operations on the encrypted symbols to produce an encrypted result which, when decrypted by a trusted party, indicates whether the two symbols are the same.

20 Claims, 3 Drawing Sheets

(58) Field of Classification Search
CPC . G06F 21/3069; G09C 5/00; G11B 20/00086; G11B 20/0021; H04K 1/00
USPC .......................................... 713/193; 380/28
See application file for complete search history.

(56) References Cited

U.S. PATENT DOCUMENTS

| | | | |
|---|---|---|---|
| 2008/0137840 | A1 | 6/2008 | Vanden Berghe et al. |
| 2011/0110525 | A1 | 5/2011 | Gentry |
| 2011/0243320 | A1 | 10/2011 | Halevi et al. |
| 2012/0039473 | A1 | 2/2012 | Gentry et al. |
| 2013/0024653 | A1* | 1/2013 | Gove .................. G06F 9/30018 712/4 |
| 2013/0170640 | A1 | 7/2013 | Gentry |
| 2014/0140514 | A1 | 5/2014 | Gentry |
| 2015/0033033 | A1 | 1/2015 | Halevi et al. |

OTHER PUBLICATIONS

RIT_2005 (2005). Retrieved from http://www.cs.rit.edu/~lr/courses/alg/student/1/. Retrieved Oct. 2, 2015.*
Smart (Apr. 2012). Fully Homormophic Encryption with Polylog Overhead. Retrieved from: https://eprint.iacr.org/2011/566.pdf.*
Pierre Baldi, et al. Countering GATTACA*: Efficient and Secure Testing of Fully-Sequenced Human Genomes (Full Version), ARXIV, Dec. 1, 2011 (pp. 1-15).
Erik-Oliver Blass, et al. "EPiC: Efficient Privacy-Preserving Counting for MapReduce", International Association for Cryptologic Research, vol. 20130411:004652, Aug. 8, 2012 (pp. 1-12).
Henning Perl, et al. "Fast Confidential Search for Bio-Medical Data Using Bloom Filters and Homomorphic Cryptography", E-Science, 2012 IEEE 8th International Conference on, IEEE, Oct. 8, 2012 (pp. 1-8).
Written Opinion of the International Searching Authority for International Application No. PCT/US2013/070168 filed Nov. 14, 2013, Written Opinion of the International Searching Authority dated Jul. 30, 2014 (10 pgs.).
International Search Report for International Application No. PCT/US2013/070168, filed Nov. 14, 2013, International Search Report dated Jul. 23, 2014 and dated Jul. 30, 2014 (4 pgs.).
Gentry, Craig; "Fully Homomorphic Encryption Using Ideal Lattices"; STOC 2009; Proceedings of the forty-first annual ACM symposium on Theory of Computing; May 31-Jun. 2, 2009; pp. 169-178.
Gentry, Craig et al.; "Implementing Gentry's Fully-Homomorphic Encryption Scheme"; IBM Research; Feb. 4, 2011; 29pp.
Gentry, Craig et al.; "Implementing Gentry's Fully-Homomorphic Encryption Scheme"; Eurocrypt 2011; International Association for Cryptologic Research; 2011; K.G. Paterson (Ed.); pp. 129-148.
MatrixCalculator (2016) https://matrixcalc.org/en, Retrieved Mar. 8, 2016 (2 pgs.).

* cited by examiner

METHOD FOR SECURE SYMBOL COMPARISON

CROSS-REFERENCE TO RELATED APPLICATION(S)

The present application claims priority to and the benefit of Provisional Application No. 61/727,654, filed Nov. 16, 2012, entitled "METHOD FOR SECURE SYMBOL COMPARISON", the contents of which are hereby incorporated herein by reference.

STATEMENT REGARDING FEDERALLY SPONSORED RESEARCH OR DEVELOPMENT

This invention was made with government support under (Contract No. FA8750-11-C-0098) awarded by the Defense Advanced Research Projects Agency (DARPA). The government has certain rights in this invention.

BACKGROUND

1. Field

This invention relates to the field of encryption and, more particularly, to a method useful in securely computing on encrypted data.

In one embodiment, the present invention relates to a method to securely compare two ciphertexts, which are each respective encryptions of two possibly different symbols, to form, without the use of secret keys or decryption, a ciphertext containing an encrypted indication of whether the symbols are the same.

2. Description of Related Art

Homomorphic encryption is a form of encryption which enables the performing of an operation on a pair of ciphertexts, producing a result which when decrypted is the same as if a corresponding operation had been performed on the plaintexts. The ciphertext operations for performing homomorphic multiplication and addition are referred to herein as EvalMult and EvalAdd, respectively. Throughout this disclosure the EvalAdd and EvalMult operations are understood to be modulus-2 operations, i.e., they are modulus-2 homomorphic addition and modulus-2 homomorphic multiplication, respectively.

For example, denoting the encryption and decryption operation as Enc and Dec respectively, we have for plaintexts a1 and a2, $Dec(EvalMult(Enc(a1), Enc(a2)))=a1*a2$, i.e., encrypting each of a1 and a2, operating on the resulting ciphertexts with the EvalMult operation, and decrypting the result, yields the product of a1 and a2, where modulus-2 arithmetic is implied throughout.

Similarly, the EvalAdd operation in a homomorphic encryption scheme has the property that for plaintexts a1 and a2, $Dec(EvalAdd(Enc(a1), Enc(a2)))=a1+a2$, i.e., encrypting each of a1 and a2, operating on the resulting cyphertexts with the EvalAdd operation and decrypting the result yields the sum of a1 and a2, where again modulus-2 arithmetic is implied throughout.

A homomorphic encryption scheme is referred to herein as somewhat homomorphic if its homomorphic characteristics support only a finite number of sequential EvalAdd or EvalMult operations. The number of EvalMult operations that may be performed on ciphertexts while ensuring that the result, when decrypted, will equal the product of the corresponding plaintexts is referred to herein as the multiplicative degree, or the depth, of the encryption scheme. An additive degree may be defined in an analogous manner. A somewhat homomorphic encryption scheme may have infinite additive degree but finite multiplicative degree. A homomorphic encryption scheme which has infinite additive degree and infinite multiplicative degree is referred to herein as a fully homomorphic encryption scheme.

An encryption scheme may be referred to as partially homomorphic if it supports only an EvalAdd or an EvalMult operation, but not both.

Homomorphic encryption may be useful, for example if an untrusted party is charged with processing data without having access to the data. A trusted party or data proprietor may encrypt the data, deliver it to the untrusted party, the untrusted party may process the encrypted data and return it to the data proprietor or turn it over to another trusted party. The recipient may then decrypt the results to extract the decrypted, processed data.

The operations desired may include comparison of symbols. An untrusted party may, for example, receive ciphertexts corresponding to two plaintext symbols from one or more data proprietors, and may wish to send a third party an encrypted indication of whether the plaintext symbols are the same, which the third party may decrypt, obtaining for example a binary 1 if the symbols match, i.e., are identical, and a binary 0 if they do not match. Thus, there is a need for a method for secure symbol comparison.

SUMMARY

This invention enables fundamental capabilities for secure computing on encrypted data. As such, a user can encrypt data, share the data with an untrusted third party that can compute algorithms on this data without access the original data or encryption keys such that the result of running the algorithm on the encrypted data can be decrypted to a result which is equivalent to the result of running the algorithm on the original unencrypted data. According to one embodiment, a user may encrypt two symbols, share the encrypted symbols with an untrusted third party, and the untrusted third party may perform a sequence of operations on the encrypted symbols to produce an encrypted result which, when decrypted by a trusted party, indicates whether the two symbols are the same.

This invention could be used by cloud computing hosts, financial institutions and any other commercial entity that may like to use or offer secure computing.

The secure symbol matching provides the capability to securely determine whether two symbols are equal on unsecure hardware without sharing data in the clear or secret keys.

This invention requires the use of either a fully homomorphic encryption (FHE) or a sufficient somewhat homomorphic encryption (SHE) scheme. FHE and SHE schemes support computation on encrypted data.

According to an embodiment of the present invention there is provided a method for comparing a first symbol and a second symbol, the method including: performing a sequence of operations, on: a first set of ciphertexts corresponding to the first symbol; and a second set of ciphertexts corresponding to the second symbol, to form a resulting ciphertext containing an encrypted indication of whether the first symbol matches the second symbol.

In one embodiment, the sequence of operations includes one or more EvalAdd operations and one or more EvalMult operations.

In one embodiment, the method includes decrypting the resulting ciphertext.

In one embodiment, the method includes: converting the first symbol into a binary representation of the first symbol; encoding the binary representation of the first symbol to form a first set of plaintext vectors; encrypting the first set of plaintext vectors with a homomorphic encryption scheme to form the first set of ciphertexts; converting the second symbol into a binary representation of the second symbol; encoding the binary representation of the second symbol to form a second set of plaintext vectors; and encrypting the second set of plaintext vectors with the homomorphic encryption scheme to form the second set of ciphertexts.

In one embodiment, the encoding of the binary representation of the first symbol to form a first set of plaintext vectors includes forming, for each bit of the binary representation, a vector of bits, the bit of the binary representation being the most significant bit of the vector of bits, and the remaining bits of the vector of bits being zero; and the encoding of the binary representation of the second symbol to form a second set of plaintext vectors includes forming, for each bit of the binary representation, a vector of bits, the bit of the binary representation being the most significant bit of the vector of bits, and the remaining bits of the vector of bits being zero.

In one embodiment, the sequence of operations includes: for each first ciphertext of the first set of ciphertexts, and for each corresponding second ciphertext of the second set of ciphertexts: homomorphically adding the first ciphertext and the second ciphertext to obtain a first encrypted sum; homomorphically inverting the first encrypted sum to obtain an encrypted factor, and homomorphically multiplying the encrypted factors to form the resulting ciphertext.

In one embodiment, the homomorphically adding of the first ciphertext and the second ciphertext to obtain a first encrypted sum includes performing an EvalAdd operation on the first ciphertext and the second ciphertext.

In one embodiment, the homomorphically inverting of the first encrypted sum to obtain an encrypted factor includes performing an EvalAdd Operation with the encrypted sum and a ciphertext encrypting a vector of bits with a leading 1.

According to an embodiment of the present invention there is provided a system for comparing a first symbol and a second symbol, the system including a processing unit configured to: perform a sequence of operations, on: a first set of ciphertexts corresponding to the first symbol; and a second set of ciphertexts corresponding to the second symbol, to form a resulting ciphertext containing an encrypted indication of whether the first symbol matches the second symbol.

In one embodiment, the sequence of operations includes one or more EvalAdd operations and one or more EvalMult operations.

In one embodiment, the processing unit is configured to decrypt the resulting ciphertext.

In one embodiment, the processing unit is configured to: convert the first symbol into a binary representation of the first symbol; encode the binary representation of the first symbol to form a first set of plaintext vectors; encrypt the first set of plaintext vectors with a homomorphic encryption scheme to form the first set of ciphertexts; convert the second symbol into a binary representation of the second, symbol; encode the binary representation of the second symbol to form a second set of plaintext vectors; and encrypt the second set of plaintext vectors with the homomorphic encryption scheme to form the second set of ciphertexts.

In one embodiment, the encoding of the binary representation of the first symbol to form a first set of plaintext vectors includes forming, for each bit of the binary representation, a vector of bits, the bit of the binary representation being the most significant bit of the vector of bits, and the remaining bits of the vector of bits being zero; and the encoding of the binary representation of the second symbol to form a second set of plaintext vectors includes forming, for each bit of the binary representation, a vector of bits, the bit of the binary representation being the most significant bit of the vector of bits, and the remaining bits of the vector of bits being zero.

In one embodiment, the sequence of operations includes: for each first ciphertext of the first set of ciphertexts, and for each corresponding second ciphertext of the second set of ciphertexts: homomorphically adding the first ciphertext and the second ciphertext to obtain a first encrypted sum; homomorphically inverting the first encrypted sum to obtain an encrypted factor, and homomorphically multiplying the encrypted factors to form the resulting ciphertext.

In one embodiment, the homomorphically adding of the first ciphertext and the second ciphertext to obtain a first encrypted sum includes performing an EvalAdd operation on the first ciphertext and the second ciphertext.

In one embodiment, the homomorphically inverting of the first encrypted sum to obtain an encrypted factor includes performing an EvalAdd operation with the encrypted sum and a ciphertext encrypting a vector of bits with a leading 1.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for secure symbol matching provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
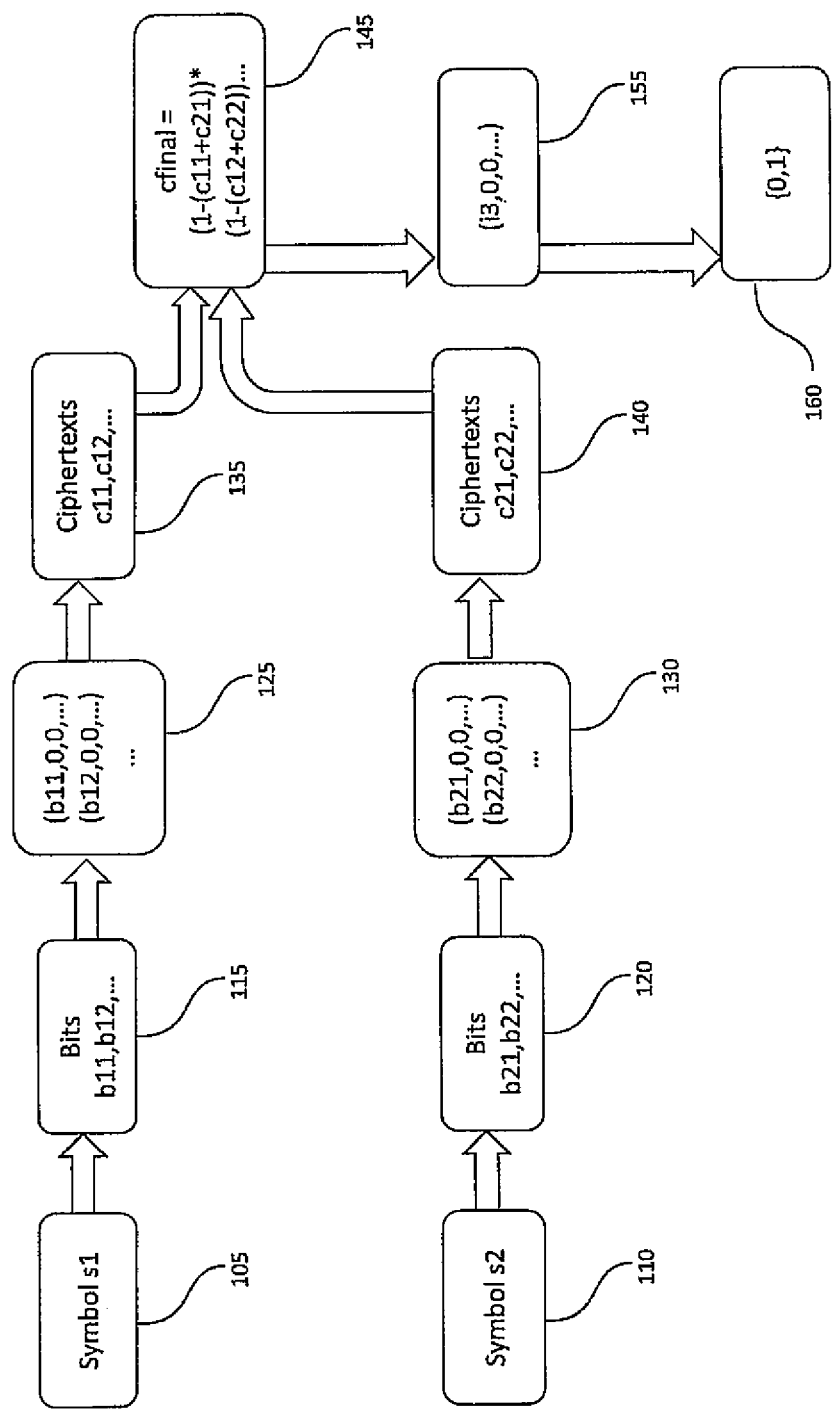
FIG. 1 is a dataflow diagram illustrating data flows, processing steps, intermediate data products, and a final result in a method for secure symbol matching according to an embodiment of the present invention.

Secure symbol matching is enabled by a novel application of somewhat homomorphic encryption (SHE) or fully homomorphic encryption (FHE). Referring to FIG. 1, in one embodiment, each of two symbols, selected from a set of symbols referred to herein as an alphabet, is used to form a sequence of ciphertexts, which are then processed with a sequence of operations to form a resulting ciphertext, the resulting ciphertext containing an encrypted indication of whether the two symbols match, i.e., are the same. To form a sequence of ciphertexts, each symbol is first mapped to a sequence of bits, i.e., a binary representation of the symbol is formed. One example of such a mapping is the American Standard Code for Information Interchange (ASCII), which maps an alphabet (referred to herein as the ASCII alphabet) including the most common characters in western languages, to a set of 7-bit binary integers.

When two plaintext symbols (s1 and s2) (elements 105, 110 in FIG. 1) are taken as input, these plaintext symbols are mapped to two corresponding multi-bit representations 115, 120. For example, plaintext symbols in the ASCII alphabet such as "a", "4" and "$", may be mapped to the corresponding 7 bits (bi1, bi2, ... , bi7) for i={1,2} used to represent the characters. Although in this example the number of bits used to represent the symbols is 7, it may in general be arbitrary, provided enough bits are used to provide a different encoding for each symbol in the alphabet. In general, for an alphabet with k symbols, the representation must have at least ceil(log 2(k)) bits. We refer to the number of bits in the binary representation of the alphabet as $\lambda$.

Each of the bits bij may then be encoded to a plaintext vector of bits (bij,0,0,0, ... ,0); (elements 125, 130 in FIG. 1). The plaintext vector is formed by making the bit bij the most significant bit of the plaintext vector, and padding the remainder of the plaintext vector with zeros, to a total length of m bits. Such vectors of bits of length m are referred to herein as m-bit-vectors; an m-bit-vector in which the first bit is a 1 is referred to as an m-bit-vector with leading 1, and an m-bit-vector in which the first bit is a 0 is referred to as an m-bit-vector with leading 0. The m-bit-vectors are encrypted using a homomorphic encryption scheme to form two sets of ciphertexts 135, 140, one set for each of the symbols, and each ciphertext corresponding to one bit of the binary representation of one symbol. This operation is represented symbolically as cij=Enc((bij,0,0,0, ... ,0)).

In one embodiment, a sequence of operations is then performed to produce a resulting ciphertext 145 which contains an encrypted indication of whether the plaintext symbols are the same. This proceeds as follows. Each pair of ciphertexts c1j, c2j is combined using the EvalAdd operation to form an intermediate result c3j: c3j=EvalAdd (c1j, c2j). The modulus-2 homomorphic addition provided by the EvalAdd operations is equivalent to a homomorphic exclusive-OR (XOR) operation; thus, each ciphertext c3j encrypts an m-bit vector with leading 0 if the corresponding bits of the two symbols are the same, and encrypts an m-bit vector with leading 1 if the corresponding bits of the two symbols are different.

The intermediate result c3j is then homomorphically inverted by computing c4j=EvalAdd(Enc(1,0,0, ... ,0),c3j) for j={1, ... , $\lambda$}, i.e., by homomorphically adding to c3j a ciphertext that encrypts an m-bit vector with a leading 1. This operation may also be represented in a shorthand symbolic notation as c4j=1−(c1j+c2j) where it is understood that the "+" and "−" symbols represent an EvalAdd operation when applied to a ciphertext. Because addition and subtraction are the same operation in modulus-2 arithmetic, the "+" and "−" symbols signify the same operation; the "−" is used for clarity to emphasize that an inverse is formed. In other embodiments, the inverse may be taken at a different point in the process. For example, c4j=(1−c1j)+c2j (the sum of the inverse of c1j and c2j) or c4j=c1j+(1−c2j) (the sum of c1j and the inverse of c2j) may be used instead. The ciphertext c4j contains an encrypted indication of whether the $j^{th}$ bits of the binary representations of the two plaintext symbols are the same. In particular, c4j encrypts an m-bit-vector with a leading 1 if the $j^{th}$ bits of the binary representations of the two plaintext symbols are the same and c4j encrypts an m-bit-vector with a leading 0 if the $j^{th}$ bits of the binary representations of the two plaintext symbols are not the same.

The ciphertexts c4j are then combined by a sequence of EvalMult operations, to form a ciphertext cfinal, which contains an encrypted indication of whether the two plaintext symbols are the same, i.e., of whether each bit of the binary representation of the first plaintext symbol s1 is the same as the corresponding bit of the binary representation of the second plaintext symbol s2, for all $\lambda$ bits. A homomorphic logical AND operation is well suited for this purpose, and the EvalMult operation, which implements modulus-2 multiplication, is equivalent to a logical AND of the most significant bits of two vectors, the remaining bits being zeros. Thus, cfinal may be formed by computing cfinal=EvalMult(c41,c42, ... ,c4$\lambda$).

The product of multiple factors c41*c42* ... *c4$\lambda$ employed in the expression for cfinal above may be implemented by operating on the factors and intermediate products pairwise using the EvalMult(a,b) operation until only one final product remains. In practice, if, at each step, intermediate products containing as nearly as possible the same number of factors are combined pairwise, the minimum degree required from an SHE scheme to implement the operation is minimized. For example, for 7 bits, EvalMult (c41,c42, ... ,c47) may be evaluated as c41*c42*c43*c44*c45*c46*c47=(((c41*c42)*(c43*c44))* ((c45*c46)*c47)) where (a*b) is used as shorthand notation for EvalMult(a,b), and the above expression requires, as can be seen by counting the nesting depth of the parentheses, at least a somewhat homomorphic encryption scheme of degree 3. In general the required depth will be ceil(log 2($\lambda$)), and in this example, ceil(log 2(7))=3. A minimum-degree EvalMult operation may be defined recursively using the relation EvalMult(a1,a2, ... , am)=EvalMult(EvalMult(a1, a2, ... , ai), EvalMult(a(i+1),a(i+2), ... , aj)) where i=j/2 if j is even, and where i is one of the two integers nearest j/2 if j is odd.

Because EvalMult(c41,c42, ... ,c4$\lambda$) implements a homomorphic logical AND of the ciphertexts c41,c42, ... ,c42$\lambda$, each of which encrypts an m-bit-vector with a leading 1 if the corresponding bits of the two symbols match, and an m-bit-vector with a leading 0 if the corresponding bits of the two symbols do not match, cfinal=EvalMult(c41,c42, ... ,c4$\lambda$) encrypts an m-bit-vector with a leading 1 if the two symbols match, and an m-bit-vector with a leading 0 if the two symbols do not match. Consequently, decrypting cfinal results in a vector 155 with components (i3, 0, 0, ... , 0), in which i3 is one if the two symbols match, and zero if they do not. Extracting the leading bit 160 from this vector results in a single bit which is 1 if the plaintext symbols match, and 0 if they do not.

In some embodiments, it may be advantageous not to decrypt cfinal, but instead to perform additional computations, e.g., to use cfinal as an input for additional computations.

Embodiments of the present invention may be practiced with any SHE (or FHE) scheme configuration as long as it provides adequate degree ceil(log 2($\lambda$)) in EvalMult computations, assuming that the encryption scheme has infinite additive degree.

Figure 2:
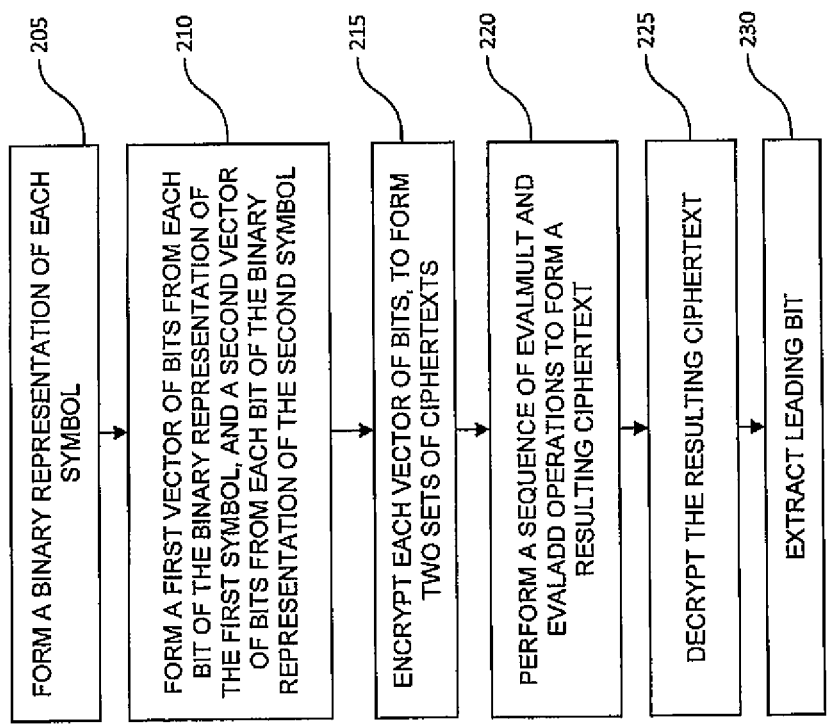
FIG. 2 is a flowchart illustrating a method for secure symbol matching according to an embodiment of the present invention.

FIG. 2 summarizes the process according to one embodiment. In an act 205, two plaintexts are mapped to corresponding $\lambda$-bit binary representations. In an act 210, each bit of each of the two $\lambda$-bit binary representations is used as the most significant bit of an m-bit vector, with the remainder of the vector padded with zeros. In act 215 each vector is encrypted into a corresponding ciphertext, and in act 220, a sequence of EvalAdd and EvalMult operations is performed on the ciphertexts. Finally, in an act 225, the ciphertext is decrypted, and in an act 230, the leading bit, which is 1 if the plaintext symbols match, and 0 they do not match, is extracted.

Figure 3:
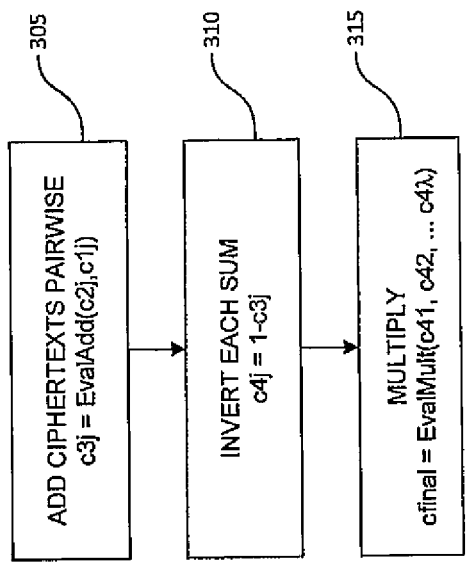
FIG. 3 is a flowchart of a subset of acts executed in a method for secure symbol matching according to an embodiment of the present invention.

FIG. 3 shows details of the sequence of operations of act 220 (FIG. 2). In an act 305, the ciphertexts are added pairwise using the EvalAdd operation. In an act 310, the sums are inverted, and in an act 315, the ciphertexts resulting from act 310 are all multiplied together homomorphically, by repeated application of the EvalMult operation.

Operations performed in embodiments of the present invention, such as the acts listed in FIGS. 2 and 3, may be performed with a processing unit. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Although limited embodiments of a method for secure symbol matching have been specifically described and illustrated herein, many modifications and variations will be apparent to those skilled in the art. For example, the mapping from symbols to binary integers need not be ASCII, nor need the symbols be selected from the English alphabet; arbitrary symbols, and an arbitrary binary representation may be used. Accordingly, it is to be understood that the method for secure symbol matching employed according to principles of this invention may be embodied other than as specifically described herein. The invention is also defined in the following claims, and equivalents thereof.

What is claimed is:

1. A method for comparing a first symbol and a second symbol, the method comprising:
   a first data proprietor encoding a bit of a binary representation of a first symbol to form a plaintext vector;
   the first data proprietor encrypting the plaintext vector with a homomorphic encryption scheme to form a ciphertext, of a first set of ciphertexts corresponding to the first symbol,
   wherein the first bit of the plaintext vector is the bit of the binary representation, and the remaining bits of the plaintext vector are zero;
   performing, by a first computer, different from the first data proprietor, a sequence of homomorphic operations, on:
   the first set of ciphertexts, received from the first data proprietor, and
   a second set of ciphertexts corresponding to a second symbol, received from a second data proprietor,
   to form a resulting ciphertext containing an encrypted indication of whether the first symbol matches the second symbol, wherein the first computer is incapable of decrypting the first set of ciphertexts, the second set of ciphertexts and the resulting ciphertext; and
   sending the resulting ciphertext to a second computer, different from the first;
   the second computer selectively decrypting the resulting ciphertext and determining whether the first symbol and the second symbol are the same.

2. The method of claim 1, wherein the sequence of homomorphic operations further comprises one or more EvalAdd operations.

3. The method of claim 1, comprising:
   encoding the binary representation of the first symbol to form a first set of plaintext vectors;
   encrypting the first set of plaintext vectors with a homomorphic encryption scheme to form the first set of ciphertexts;
   converting the second symbol into a binary representation of the second symbol;
   encoding the binary representation of the second symbol to form a second set of plaintext vectors; and
   encrypting the second set of plaintext vectors with the homomorphic encryption scheme to form the second set of ciphertexts.

4. The method of claim 3, wherein:
   the encoding of the binary representation of the first symbol to form a first set of plaintext vectors comprises forming, for each bit of the binary representation, a vector of bits, the bit of the binary representation being the most significant bit of the vector of bits, and the remaining bits of the vector of bits being zero; and
   the encoding of the binary representation of the second symbol to form a second set of plaintext vectors comprises forming, for each bit of the binary representation, a vector of bits, the bit of the binary representation being the most significant bit of the vector of bits, and the remaining bits of the vector of bits being zero.

5. The method of claim 1, wherein the sequence of homomorphic operations comprises:
   for each first ciphertext of the first set of ciphertexts, and for each corresponding second ciphertext of the second set of ciphertexts:
   homomorphically adding the first ciphertext and the second ciphertext to obtain a first encrypted sum; and
   homomorphically inverting the first encrypted sum to obtain an encrypted factor, and
   homomorphically multiplying the encrypted factors to form the resulting ciphertext.

6. The method of claim 5, wherein the homomorphically adding of the first ciphertext and the second ciphertext to obtain a first encrypted sum comprises performing an EvalAdd operation on the first ciphertext and the second ciphertext.

7. The method of claim 5, wherein the homomorphically inverting of the first encrypted sum to obtain an encrypted factor comprises performing an EvalAdd operation with the first encrypted sum and a ciphertext encrypting a vector of bits with a leading 1.

8. The method of claim 1, wherein the sequence of homomorphic operations comprises a homomorphic multiplication of at least four factors, the homomorphic multiplication comprising:
   an evalMult of a first factor of the at least four factors with a second factor of the at least four factors, and
   an evalMult of a third factor of the at least four factors with a fourth factor of the at least four factors.

9. The method of claim 1, wherein the sequence of homomorphic operations comprises a homomorphic multiplication of a plurality of factors in a tree-like order.

10. The method of claim 1, wherein the second computer is the first data proprietor and the second computer is the second data proprietor.

11. A system for comparing a first symbol and a second symbol, the system comprising:
    a first computer;
    a second computer;
    a first data proprietor, different from the first computer; and a second data proprietor, the first data proprietor being configured to:
  encode a bit of a binary representation of a first symbol to form a plaintext vector; and
  encrypt the plaintext vector with a homomorphic encryption scheme to form a ciphertext, of a first set of ciphertexts corresponding to the first symbol, wherein the first bit of the plaintext vector is the bit of the binary representation, and the remaining bits of the plaintext vector are zero;
the first computer being configured to:
  perform a sequence of homomorphic operations, on:
    the first set of ciphertexts, received from the first data proprietor, and
    a second set of ciphertexts corresponding to a second symbol, received from the second data proprietor,
  to form a resulting ciphertext containing an encrypted indication of whether the first symbol matches the second symbol, wherein the first computer is incapable of decrypting the first set of ciphertexts, the second set of ciphertexts and the resulting ciphertext; and
  send the resulting ciphertext to a second computer, different from the first;
the second computer selectively decrypting the resulting ciphertext and determining whether the first symbol and the second symbol are the same.

12. The system of claim 11, wherein the sequence of homomorphic operations further comprises one or more EvalAdd operations.

13. The system of claim 11, wherein:
the first data proprietor is configured to:
  encode the binary representation of the first symbol to form a first set of plaintext vectors;
  encrypt the first set of plaintext vectors with a homomorphic encryption scheme to form the first set of ciphertexts; and
the second data proprieter is configured to:
  convert the second symbol into a binary representation of the second symbol;
  encode the binary representation of the second symbol to form a second set of plaintext vectors; and
  encrypt the second set of plaintext vectors with the homomorphic encryption scheme to form the second set of ciphertexts.

14. The system of claim 13, wherein:
the encoding of the binary representation of the first symbol to form a first set of plaintext vectors comprises forming, for each bit of the binary representation, a vector of bits, the bit of the binary representation being the most significant bit of the vector of bits, and the remaining bits of the vector of bits being zero; and
the encoding of the binary representation of the second symbol to form a second set of plaintext vectors comprises forming, for each bit of the binary representation, a vector of bits, the bit of the binary representation being the most significant bit of the vector of bits, and the remaining bits of the vector of bits being zero.

15. The system of claim 11, wherein the sequence of homomorphic operations comprises:
for each first ciphertext of the first set of ciphertexts, and for each corresponding second ciphertext of the second set of ciphertexts:
  homomorphically adding the first ciphertext and the second ciphertext to obtain a first encrypted sum; and
  homomorphically inverting the first encrypted sum to obtain an encrypted factor, and
homomorphically multiplying the encrypted factors to form the resulting ciphertext.

16. The system of claim 15, wherein the homomorphically adding of the first ciphertext and the second ciphertext to obtain a first encrypted sum comprises performing an EvalAdd operation on the first ciphertext and the second ciphertext.

17. The system of claim 15, wherein the homomorphically inverting of the first encrypted sum to obtain an encrypted factor comprises performing an EvalAdd operation with the first encrypted sum and a ciphertext encrypting a vector of bits with a leading 1.

18. The system of claim 11, wherein the sequence of homomorphic operations comprises a homomorphic multiplication of at least four factors, the homomorphic multiplication comprising:
  an evalMult of a first factor of the at least four factors with a second factor of the at least four factors, and
  an evalMult of a third factor of the at least four factors with a fourth factor of the at least four factors.

19. The system of claim 11, wherein the sequence of homomorphic operations comprises a homomorphic multiplication of a plurality of factors in a tree-like order.

20. The system of claim 11, wherein the second computer is the first data proprietor and the second computer is the second data proprietor.

* * * * *